F. W. DUBROW.
ARTIFICIAL FISH BAIT.
APPLICATION FILED JAN. 4, 1919.
1,314,052.
Patented Aug. 26, 1919.
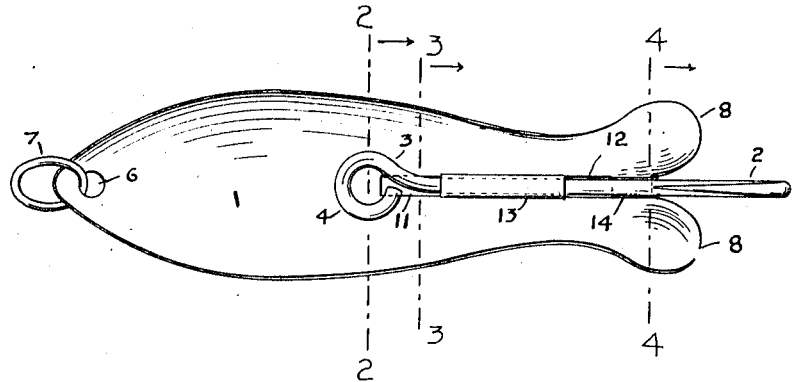
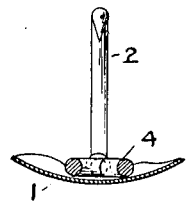
FIG. 2
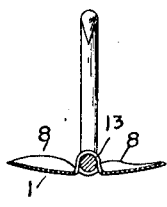
FIG. 3
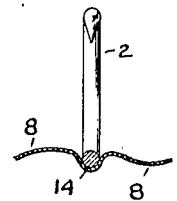
FIG. 4
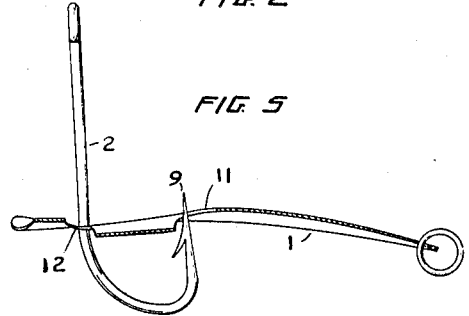
FIG. 5
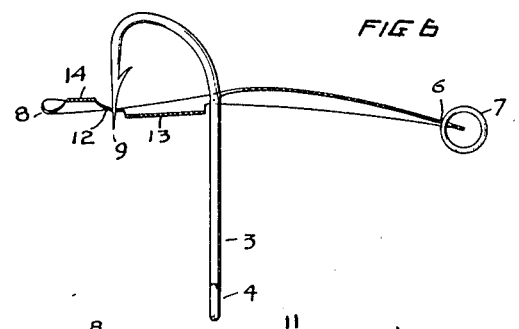
FIG. 6
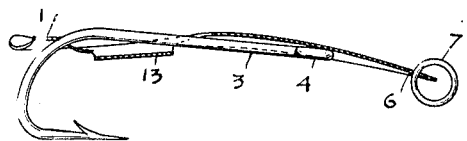
FIG. 7
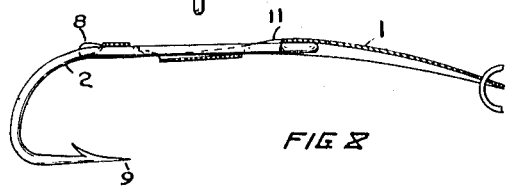
FIG. 8
INVENTOR
F. W. DUBROW
BY  *Fm. Wright,*
ATT'Y

UNITED STATES PATENT OFFICE.

FREDRICK WILLIAM DUBROW, OF SAUSALITO, CALIFORNIA.

ARTIFICIAL FISH-BAIT.

1,314,052.　　　　Specification of Letters Patent.　　Patented Aug. 26, 1919.

Application filed January 4, 1919. Serial No. 269,723.

*To all whom it may concern:*

Be it known that I, FREDRICK WILLIAM DUBROW, a citizen of the United States, residing at Sausalito, in the county of Sausalito and State of California, have invented new and useful Improvements in Artificial Fish-Baits, of which the following is a specification.

The present invention relates to improvements in artificial fish baits and especially to that form thereof for which I have on Sep. 19, 1917, filed an application Serial Number 192,054 for Letters Patent of the United States.

The object of the present invention is to so form the artificial fish bait that the hook may be easily and quickly secured to, or detached from, the spoon forming part of the bait without the necessity of employing a screw or other extraneous means for attaching it to the spoon.

In the accompanying drawing, Figure 1 is a plan view of the bait in the position of use; Figs. 2, 3 and 4 are cross-sectional views on the lines 2—2, 3—3 and 4—4 of Fig. 1; Figs. 5, 6, 7, and 8 are central longitudinal sections of the bait in different stages of the operation of securing the hook to the spoon.

Referring to the drawing, 1 indicates a spoon forming a portion of the bait and 2 a hook. The shank 3 of the hook is formed, at the end remote from the hook proper, with a flat loop 4, extending in a plane at right angles to that in which the hook extends from the shank. The main body of the spoon 1 is of a concavo-convex form and tapers to almost a point at the front end, in which is a hole 6 to receive a loop 7 for attachment to the fishing line. The rear end of the spoon is formed somewhat like a fish tail, except that its two side portions 8 are curved respectively in opposite directions from the spoon, so that said tail has approximately a helical form, imparting to the bait a rotary motion as it is drawn through the water. As explained in my application above referred to, on account of this helical form of the tail and of the concavo-convex form of the body of the spoon, the bait is thus caused to travel in a helical path through the water, the diameter of the helix being considerably greater than that of the spoon itself. Such an artificial bait has been observed to travel in a helical path of a diameter of about 8 inches.

The spoon is provided with fore and aft longitudinally extending slots 11, 12, a groove 13 between said slots and a groove 14 between the rear slot 12 and the rear end of the spoon. These slots and grooves are all in alinement and in the center of the spoon. The grooves 13 and 14 are formed in opposite directions, the groove 13 being a depression from the convex side of the spoon, and the groove 14 being a depression from its concave side.

The hook is secured to the spoon in the following manner: As shown in Fig. 5, the point 9 of the hook is first inserted through the slot 11 from the concave side of the spoon, and, the hook being turned, is then inserted through the slot 12 from the convex side thereof, as shown in Fig. 6. The hook, being continually turned about a transverse axis parallel with a plane approximating the surface of the spoon, is moved to the position shown in Fig. 7, in which the barb of the hook extends at some distance from the spoon, while the loop 4 of the shank rests against its concave surface. The hook is then pulled to the rear, its shank traveling in the two grooves 13 and 14, and in doing so the pressure of the shank against the spoon in the groove 14 forces the loop 4 firmly against the concave portion of the spoon until it is finally pulled to rest in the position shown in Fig. 8, this position being such that the pressure of the spoon against the eye 4 is so great that the hook cannot be pulled any farther to the rear. In this position it will be seen that a pull on the hook by a fish serves only to secure the hook more firmly in the spoon.

The hook is detached from the spoon by reversing the above operation, the first step being to knock the hook forwardly from the position shown in Fig. 8.

I thus render the bait independent of any extraneous securing means such as a screw or bolt.

I claim:—

1. In combination, a hook and a spoon for holding the hook having two longitudinally extending slots and a grooved portion between said slots.

2. In combination, a hook and a spoon for holding the hook having two longitudinally extending slots, a grooved portion between said slots and a portion grooved in the opposite direction to said first named groove and extending in a line therewith behind the rear slot.

3. In combination with a hook of which the shank has an eye, a concavo-convex spoon, having holes therethrough, of which one is in front of the other and through both of which the shank of the hook extends, the portion of the spoon between said holes being curved to lie on the opposite side of said shank from the remainder of the spoon.

FREDRICK DUBROW.